United States Patent
Felteau (10) Patent No.: US 11,991,759 B2
(45) Date of Patent: *May 21, 2024

(54) SIGNAL STRENGTH REPRESENTATION AND AUTOMATIC CONNECTION AND CONTROL UPON A SELF-PROPELLED DEVICE

(71) Applicant: Sphero, Inc., Boulder, CO (US)

(72) Inventor: Wesley Felteau, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/188,091

(22) Filed: Mar. 1, 2021

(65) Prior Publication Data

US 2021/0259030 A1    Aug. 19, 2021

Related U.S. Application Data

(63) Continuation of application No. 16/160,320, filed on Oct. 15, 2018, now Pat. No. 10,939,479, which is a continuation of application No. 14/618,913, filed on Feb. 10, 2015, now Pat. No. 10,104,699.

(51) Int. Cl.
| | |
|---|---|
| H04W 76/10 | (2018.01) |
| G06F 1/16 | (2006.01) |
| G08C 17/00 | (2006.01) |
| G08C 17/02 | (2006.01) |
| H04B 1/3827 | (2015.01) |
| H04W 4/40 | (2018.01) |
| H04W 4/80 | (2018.01) |

(52) U.S. Cl.
CPC ......... *H04W 76/10* (2018.02); *G06F 1/1698* (2013.01); *G08C 17/00* (2013.01); *G08C 17/02* (2013.01); *H04B 1/3833* (2013.01); *H04W 4/40* (2018.02); *H04W 4/80* (2018.02); *G08C 2201/93* (2013.01)

(58) Field of Classification Search
CPC ......... H04W 76/10; H04W 4/40; H04W 4/80; G06F 1/1698; G08C 17/00; G08C 17/02; G08C 2201/93; H04B 1/3833
See application file for complete search history.

(56) References Cited

U.S. PATENT DOCUMENTS

| | | | | |
|---|---|---|---|---|
| 4,996,715 A * | 2/1991 | Marui | ................... | H04W 88/02 455/566 |
| 7,944,340 B1 * | 5/2011 | Ghabra | ................... | G08C 17/02 307/10.1 |
| 8,787,823 B2 * | 7/2014 | Justice | ................... | G07C 5/008 455/7 |
| 9,020,697 B2 * | 4/2015 | Ricci | ....................... | B60R 25/00 701/36 |
| 9,123,186 B2 * | 9/2015 | Ricci | ....................... | H04W 4/21 |

(Continued)

*Primary Examiner* — Frederick M Brushaber (57) ABSTRACT

Systems and methods for facilitating automatic connection between a mobile computing device and a self-propelled device are provided. The self-propelled device can transmit a radio signal in a sleep mode. The mobile computing device may detect the radio signal and generate a visual representation of the signal strength to facilitate in establishing an automatic connection. Once the signal strength crosses a predetermined threshold, a connection and control sequence may be initiated automatically in which a control mode may be initiated on the mobile computing device to enable user control of the self-propelled device.

18 Claims, 5 Drawing Sheets

(56) References Cited

U.S. PATENT DOCUMENTS

| | | | | |
|---|---|---|---|---|
| 9,235,941 B2* | 1/2016 | Ricci | | B60R 25/20 |
| 9,260,244 B1* | 2/2016 | Cohn | | G06Q 10/08 |
| 9,290,153 B2* | 3/2016 | Ricci | | G08G 1/07 |
| 9,563,201 B1* | 2/2017 | Tofte | | G05D 1/0038 |
| 9,883,209 B2* | 1/2018 | Ricci | | H04L 67/10 |
| 9,886,033 B2* | 2/2018 | Seydoux | | H04L 67/12 |
| 2004/0239482 A1* | 12/2004 | Fitzgibbon | | G08C 17/00 |
| | | | | 340/5.7 |
| 2006/0071808 A1* | 4/2006 | Nagata | | B60R 25/24 |
| | | | | 340/13.24 |
| 2007/0132773 A1* | 6/2007 | Plante | | G07C 5/0891 |
| | | | | 345/564 |
| 2009/0295635 A1* | 12/2009 | Smoot | | H01Q 1/28 |
| | | | | 342/359 |
| 2012/0015686 A1* | 1/2012 | Krupnik | | G10L 15/22 |
| | | | | 455/550.1 |
| 2012/0092129 A1* | 4/2012 | Lickfelt | | B60R 25/24 |
| | | | | 340/5.72 |
| 2012/0242481 A1* | 9/2012 | Gernandt | | G06K 19/0705 |
| | | | | 340/572.1 |
| 2013/0029608 A1* | 1/2013 | Kuo | | H04W 24/00 |
| | | | | 455/67.11 |
| 2013/0265139 A1* | 10/2013 | Nummila | | G06K 19/0723 |
| | | | | 340/10.1 |
| 2014/0051364 A1* | 2/2014 | Simons | | B60R 25/20 |
| | | | | 455/68 |
| 2014/0309806 A1* | 10/2014 | Ricci | | H04W 12/088 |
| | | | | 701/1 |
| 2014/0309870 A1* | 10/2014 | Ricci | | G06F 3/0481 |
| | | | | 701/36 |
| 2014/0309880 A1* | 10/2014 | Ricci | | G01C 21/3484 |
| | | | | 701/1 |
| 2014/0309886 A1* | 10/2014 | Ricci | | G07C 5/0833 |
| | | | | 701/41 |
| 2014/0309891 A1* | 10/2014 | Ricci | | G08B 21/0205 |
| | | | | 701/1 |
| 2014/0310594 A1* | 10/2014 | Ricci | | G06F 3/0622 |
| | | | | 715/702 |
| 2014/0310610 A1* | 10/2014 | Ricci | | B60C 1/00 |
| | | | | 715/744 |
| 2014/0310739 A1* | 10/2014 | Ricci | | G06Q 20/321 |
| | | | | 725/75 |
| 2014/0323039 A1* | 10/2014 | Hong | | H04B 7/24 |
| | | | | 455/39 |
| 2014/0355517 A1* | 12/2014 | Reunamaki | | H04W 8/005 |
| | | | | 370/328 |
| 2014/0370810 A1* | 12/2014 | Huang | | H04B 7/26 |
| | | | | 455/88 |
| 2015/0055622 A1* | 2/2015 | Roh | | H04W 36/26 |
| | | | | 370/331 |
| 2015/0071102 A1* | 3/2015 | Sadasivam | | H04W 4/026 |
| | | | | 370/252 |
| 2016/0046468 A1* | 2/2016 | Heravi | | B66D 1/54 |
| | | | | 715/835 |
| 2016/0205419 A1* | 7/2016 | Ricci | | B60Q 1/544 |
| | | | | 725/75 |
| 2016/0284185 A1* | 9/2016 | Maison | | H04B 5/0025 |
| 2016/0313732 A1* | 10/2016 | Seydoux | | G02B 27/0172 |
| 2018/0083848 A1* | 3/2018 | Siddiqi | | H04L 67/131 |

\* cited by examiner

SIGNAL STRENGTH REPRESENTATION AND AUTOMATIC CONNECTION AND CONTROL UPON A SELF-PROPELLED DEVICE

BACKGROUND

Remote controlled devices have previously been operated using specialized remote controllers specific to a particular device. With the onset of network technology and mobile application development, multi-functional mobile devices may be configured to operate and control such remote controlled devices based on a variety of wireless connections.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Systems and methods are provided for facilitating automatic connection between a mobile computing device and a self-propelled device to enable control over the self-propelled device. In a sleep mode, the self-propelled device can emit a radio signal. Within a proximity to the self-propelled device, the mobile computing device may detect the emitted signal and generate a dynamic representation of the signal strength of the radio signal for display. If the signal strength crosses a predetermined threshold, a connection may be initiated to establish a connection with the self-propelled device. When the connection is established, an automatic function may be performed by the self-propelled device, such as a visual and/or audible greeting function. Further implementations can include a automatic connect and control sequence, which may be initiated upon the signal strength crossing the predetermined threshold to automatically launch a control application on the mobile computing device to enable a user to remotely operate the self-propelled device.

According to examples, the emitted radio signal from the self-propelled device can comprise a Bluetooth low energy beacon. The mobile computing device can perform a linear regression technique to stabilize a received signal strength indicator (RSSI) corresponding to the Bluetooth low energy beacon. Stabilizing the RSSI can comprise dynamically inputting individually received RSSI values into the linear regression model to output the stabilized RSSI, which may then be utilized to generate the dynamic representation of the signal strength.

Further implementations include a self-propelled device operable in a sleep mode and a control mode. In the sleep mode, the self-propelled device can utilize an internal radio processor to (i) emit a radio signal, (ii) establish a connection with a mobile computing device based on a proximity of the mobile computing device to the self-propelled device, and (iii) in response to establishing the connection, awaken an internal main processor and initiate the control mode on the self-propelled device. In the control mode, the self-propelled device can utilize the main processor to (i) perform an automated function based on received data, (ii) receive control commands from the mobile computing device to maneuver the self-propelled device, and/or (iii) implement the control commands on the internal drive system to maneuver the self-propelled device.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System and Device Description

Figure 1:
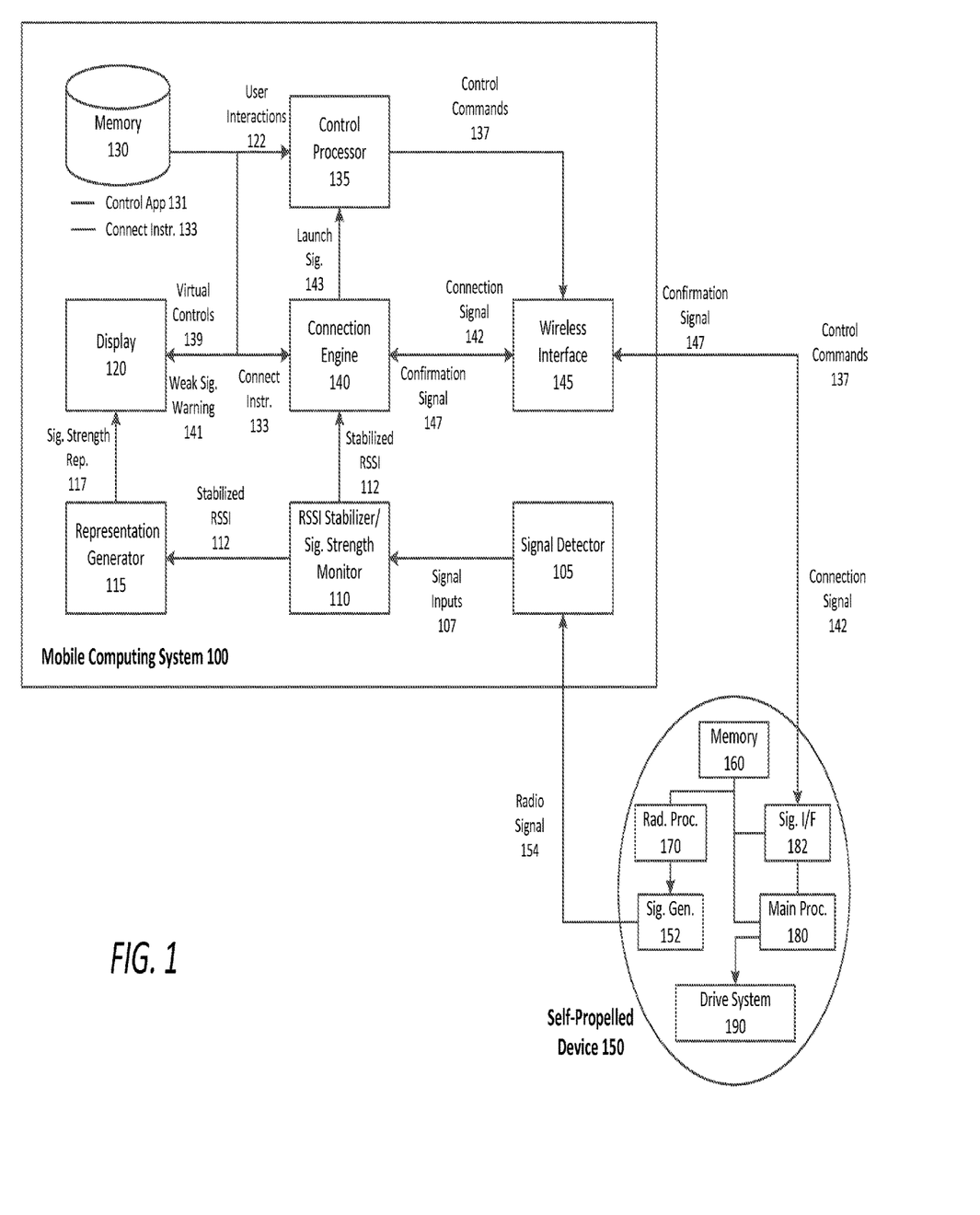
FIG. 1 is a block diagram illustrating an example mobile computing system performing a connection and control operation with a self-propelled device.

FIG. 1 is a block diagram illustrating an example mobile computing system performing a connection and control operation with a self-propelled device. The self-propelled device 150 may initially operate in a sleep mode in which all dynamic functions of the self-propelled device 150 can be deactivated or powered down. In this sleep mode, a low-power radio processor 170 of the self-propelled device 150 may trigger a signal generator 152 to periodically generate and emit a radio signal 154. In various examples, the signal generator 152 can implement a Bluetooth wireless protocol and emit the radio signal 154 in accordance with Bluetooth low energy technology. For Bluetooth low energy implementations, the self-propelled device 152 may continuously operate in the sleep mode for extended periods of time (e.g., on the order of months or years). However, various other wireless protocols are contemplated, including infrared and other radio-frequency (RF) systems.

As discussed herein, the self-propelled device 150 may be any device capable of remote operation and including a drive mechanism. Such devices may include various types of remote controlled vehicles (e.g., cars, boats, planes, helicopters, etc.), or robotic devices, toys, or other devices capable of remote operation. Furthermore, the mobile computing system 100 described herein may be any mobile device capable of remote control of the self-propelled device 150. Such mobile computing systems 100 can include multi-functional devices, such as mobile computing devices (e.g., smartphones, tablets, laptops, computing accessories, and the like). However, it is also contemplated that one of the mobile computing system 100 or the self-propelled device 150 may be stationary or substantially stationary and dynamic signal strength representation and automatic connection and control examples described herein may still be implemented.

While in sleep mode, the radio processor 170 can trigger the signal generator 152 to periodically emit the radio signal 154 to advertise its availability for connection and control. In some implementations, this "advertising interval" may be on the order of milliseconds (e.g., 100-1000 milliseconds). However, it is contemplated that in various other implementations, the advertising interval may be any constant or variable value in which the signal generator 152 emits beacons.

The mobile computing system 100 can include a signal detector 105 to detect the radio signal 154 emitted by the signal generator 152. The signal detector 105 may directly transmit the radio signal 154 to a signal strength monitor 110, in which the received signal strength indicator (RSSI) corresponding to the radio signal 154 may be generated and/or monitored. Additionally or alternatively, each raw radio signal 154 beaconed from signal generator 152 may be transmitted as signal inputs 107 from the signal detector 105 to the signal strength monitor 110. In various examples, the signal strength monitor 110 may include an RSSI stabilizer comprising logic to stabilize the RSSI in order to provide an accurate measurement of the signal strength of the radio signal 154. In some examples, the RSSI stabilizer/signal strength monitor 110 can perform a linear regression technique in order to output a stabilized RSSI 112. In other examples, RSSI stabilization may be performed in which the RSSI/stabilizer/signal strength monitor 110 may implement spatial diversity techniques utilizing multiple antennas, RSSI fusion, adaptive location and tracking, and/or other RSSI stabilization methods.

The signal strength monitor 110 may transmit the stabilized RSSI to a representation generator 115, which can generate a dynamic visual representation of the signal strength 117 of the radio signal 154 based on the stabilized RSSI 112. The dynamic visual representation 117 may then be transmitted to the display 120 of the mobile computing system 100. In some implementations, the dynamic visual representation of the signal strength 117 may be displayed with a threshold indicator representing a predetermined threshold signal strength in which an automatic connection to the self-propelled device 150 may be initiated. As a user of the mobile computing system 100 moves closer to the self-propelled device 150, the increase in signal strength may be dynamically reflected in the visual representation 117. Once the signal strength crosses the predetermined threshold, the automatic connection and control sequence may be initiated.

In some examples, the mobile computing system 100 can also include a connection engine 140 which may receive the stabilized RSSI 112 from the signal strength monitor 110. The mobile computing system 100 can further include a memory 130 that stores connection instructions 133, which may be implemented by the connection engine 140 to initiate and execute the automatic connection sequence. In some examples, based on the stabilized RSSI, the connection engine 140 can determine when the signal strength of the radio signal 154 crosses the predetermined threshold. In such examples, the connection engine 140 may continuously compare the stabilized RSSI 112 with the predetermined threshold value. Once the stabilized RSSI 112 exceeds the threshold value, the connection engine 140 can instigate an automatic connection with the self-propelled device 150. As an alternative, once the signal strength crosses the predetermined threshold, as measured or as visually represented on the display 120, the connection engine 140 may generate a user prompt on the display 120 indicating whether the user wishes to initiate the connection and control sequence to establish a connection with the self-propelled device.

In other examples, the connection engine 140 may operate to monitor the displayed dynamic representation of the signal strength 117. As the signal strength increases, the dynamic representation 117 may be shown to visually cross the displayed threshold indicator, and this visual crossing of the threshold indicator may trigger the connection engine 140 to initiate the connection sequence. In various examples, the initiation of the connection sequence may also be indicated on the display 120. Once the connection is established, a number of interactions may take place between the mobile computing device 100 and the self-propelled device 150. For example, the self-propelled device 150 may be programmed to initiate a greeting as described in detail below. Additionally or alternatively, upon establishing the connection, the mobile computing system can transition into a controller device to enable a user to control operation of the self-propelled device 150.

Once the signal strength crosses the predetermined threshold, either as measured by the connection engine 140 or as represented on the display 120, the connection engine 140 can generate a connection signal 142 for transmission to the self-propelled device 150. The mobile computing system 100 can include a wireless interface 145 for signal transmission. Thus, the connection engine 140 may transmit the connection signal to the self-propelled device 150 via the wireless interface 145 to establish the connection.

The mobile computing system 100 and the self-propelled device 150 may include hardware for wireless communication in accordance with one or more communication standards. Thus, the connection between the mobile computing system 100 and the self-propelled device 150 can be established in accordance with one or more of a variety of wireless network technologies, including Bluetooth low energy, Wireless USB, and various Wi-Fi or other wireless standards.

According to many implementations, the self-propelled device 142 can include a signal interface 182 to receive signals from the mobile computing system 100. As discussed above, the self-propelled device 150 operates in a sleep mode in which all dynamic functions are deactivated. The connection signal 142 can ultimately awaken a main processor 180 of the self-propelled device 150 in order to prepare the self-propelled device 150 for operation. In some examples, the signal interface 182 may be coupled to the main processor 180, in which the received connection signal 142 directly triggers the main processor 180 to power up the self-propelled device 150 and establish a connection with the mobile computing system 100.

Additionally or alternatively, the connection signal 142 may be received by one or more antennas of the self-propelled device 150 in the sleep mode. The radio processor 170, which is in operation during the sleep mode, may recognize the connection signal 142 and awaken the main processor 180 to initiate a control mode on the self-propelled device 150.

The self-propelled device 150 may include a memory resource 160 storing instructions for operation of the self-propelled device 150 in both sleep mode and control mode. Implementation of such instructions by the radio processor 170 may comprise transmission of the radio signal 154 at predetermined intervals, adjusting power, detecting the connection signal 142, and awakening the main processor 180 to initiate control mode. Implementation of the instructions by the main processor 180 may comprise identifying the connection signal 142, receiving control commands 137, translating the control commands 137 into drive instructions, and implementing the control commands 137 and/or drive instructions on a drive system 190 of the self-propelled device 150.

Additionally or alternatively, the main processor 180 may transmit a confirmation signal 147, in response to receiving the connection signal 142, indicating that control mode on the self-propelled device 150 has been initiated and/or a connection with the mobile computing system 100 has been established. The confirmation signal 147 may be received by the connection engine 140, which may then generate a launch signal 143 to cause a control processor 135 of the mobile computing system 100 to initiate a control application 131.

According to several examples, upon establishing the connection, the mobile computing system 100 and/or the self-propelled device 150 can automatically perform a function. The function can comprise the self-propelled device initiating a greeting to the user of the mobile computing device 100. The greeting may be preprogrammed to execute automatically on the self-propelled device 150 upon establishing the connection. The greeting may be a standard action, such as illuminating visual elements of the self-propelled device 150 and/or performing one or more maneuvers (e.g., a spin) as a predetermined salutation to the user. Additionally or alternatively, the self-propelled device 150 can pull data from the mobile computing device 100, or an application running on the mobile computing device 100, in order to perform a greeting function to the user. For example, upon connecting with the mobile computing device 100, the self-propelled device 150 can receive data from the mobile computing device 100, such as calendar data, contact information, cached content (e.g., travel information associated with, for example, distance traveled over a duration of time), call log information, messaging information, and the like. Based on such received data, the self-propelled device 150 can initiate a greeting to the user.

Additionally or alternatively, upon establishing the connection, the self-propelled device 150 can initiate network connectivity, individually or via the mobile computing device 100, in order to pull data from a network (e.g., the Internet). For example, the self-propelled device 150 can identify weather data from a weather resource over the network, and initiate a greeting based on the current or daily weather forecast. Such a greeting may comprise an audible suggestion—such as suggesting wet weather attire for the user if it is raining or warm attire if it is cold.

In various implementations, the memory 130 of mobile computing system 100 can store the control application 131 specific to controlling the self-propelled device 150. This control application 131 may be previously downloaded or otherwise installed on the mobile computing system 100 specifically to operate the self-propelled device 150 and/or multiple self-propelled devices.

Accordingly, in response to receiving the launch signal 143 from the connection engine 140, the control processor 135 may access and launch the control application 131 from the memory 130 automatically. Alternatively, in response to receiving the launch signal 143 from the connection engine 140, the control processor 135 may issue a prompt on the display 120, allowing the user to confirm whether initiating the control application 131 is desired.

In some examples, launch of the control application 131 may be performed in conjunction with the connection engine 140 transmitting the connection signal 142 to the self-propelled device 150. In such examples, the control processor 135 may also monitor the signal strength of the radio signal 154 and automatically launch the control application 131 when the signal strength crosses the predetermined threshold—either as measured or as visually represented on the display 120. In similar examples, establishing the connection with the self-propelled device 150 may be synonymous to launching the control application 131. As such, once the signal strength of the radio signal 154 crosses the predetermined threshold, the control processor may automatically, or via user prompt, establish the connection with the self-propelled device 150. Thus, in such implementations, establishing the connection and enabling control operations on the mobile computing system 100 is automatic upon achieving the threshold signal strength.

Additionally or alternatively, launch of the control application 131 can cause the control processor 135 to generate virtual controls 139 and other interactive features for display. In various examples, the virtual controls 139 enable a user of the mobile computing system 100 to remotely operate the self-propelled device 150. The user may interact with the virtual controls 139, such as a two-dimensional virtual steering mechanism, and such user interactions 122 can be translated by the control processor 135 into control commands 137, which may be transmitted to the self-propelled device 150 for implementation. Such control commands 137 may be received by the main processor 180 and implemented on the drive system 190 of the self-propelled device 150.

In other examples, the user interactions 122 on the virtual controls 139 can be transmitted directly (e.g., in raw form) to the self-propelled device 150, in which the main processor 180 may translate such user interactions 122 as commands to be implemented on the drive system 190. As such, the processing of the user interactions 122 on the virtual controls 139 may be outsourced to the self-propelled device 150.

According to several of the above examples in reference to FIG. 1, upon initiation of the control application 131, the RSSI stabilizer or signal strength monitor 110 of the mobile computing device 100 can monitor the radio signal 154 emitted from a radio-frequency resource (e.g., a Bluetooth low energy module) of the self-propelled device 150. Once the RSSI exceeds or crosses a threshold, the mobile computing device 100 may automatically establish a connection with the self-propelled device 150. Once the connection is established, the virtual controls 139 may be rendered on the display 120 to enable the user of the mobile computing device 100 to control and maneuver the self-propelled device 150 remotely via the established connection (e.g., Bluetooth low energy) by performing user interactions 122 on the virtual controls 139.

Additional examples in connection with FIG. 1 are contemplated. For example, while the connection is established with the self-propelled device 150, the RSSI stabilizer and signal strength monitor 110 can continue to monitor the RSSI. According to examples, if the signal weakens beyond a threshold, corresponding to the mobile computing device 100 moving away from the self-propelled device 150, the connection engine 140 can generate a weak signal warning 141 to be displayed on the display 120 of the mobile computing device 100. The weak signal warning 141 can communicate to the user, that if the signal becomes weaker or crosses a critical threshold, the radio signal 154 will be too weak for effective interaction. Upon crossing the critical threshold, the mobile computing device 100 can lose connectivity, or otherwise automatically disconnect with the self-propelled device 150.

The weak signal warning 141 may be generated as an alert to be displayed in conjunction with a rendered interface (e.g., virtual controls 139) of the mobile computing device 100. Alternatively, the weak warning signal 141 may be generated to include the signal strength representation 117, to demonstrate to the user that the connection requires a certain amount of signal strength.

While examples discussed with regard to FIG. 1 largely involve interaction between the mobile computing device 100 and the self-propelled device 150, establishing the connection based on a stabilized RSSI may be implemented in connection with various devices operating under certain wireless protocols (e.g., Bluetooth low energy). For example, the self-propelled device 150 of FIG. 1 may be substituted with an accessory device or multiple accessory devices. Such accessory devices may include a radio-frequency module with RSSI functionality (e.g., signal generator 152). These accessory devices can include or exclude any number of the components of the example self-propelled device 150 illustrated in FIG. 1. For example, an example accessory device, such as a robot, can include the radio processor 170 and signal generator 152, but exclude a main processor 180 and drive system 190.

Accessory devices as described herein may include static interactive devices operable in conjunction with the self-propelled device 150. For example, the mobile computing device 100 may establish a connection, based on the RSSI threshold, with a number of accessory devices as well as the self-propelled device 150, and interactions between the self-propelled device 150 and the accessory devices may be recorded (e.g., maneuvers performed on accessory devices, such as a ramp and/or race track object). Thus, one or more of the interactions between the self-propelled device 150 and the accessory devices, all of which may be connected to the mobile computing device 100 under operation by a user, may be recorded and tallied in relation to a control application 131 running on the mobile computing device 100.

Figures 2A, 2B:
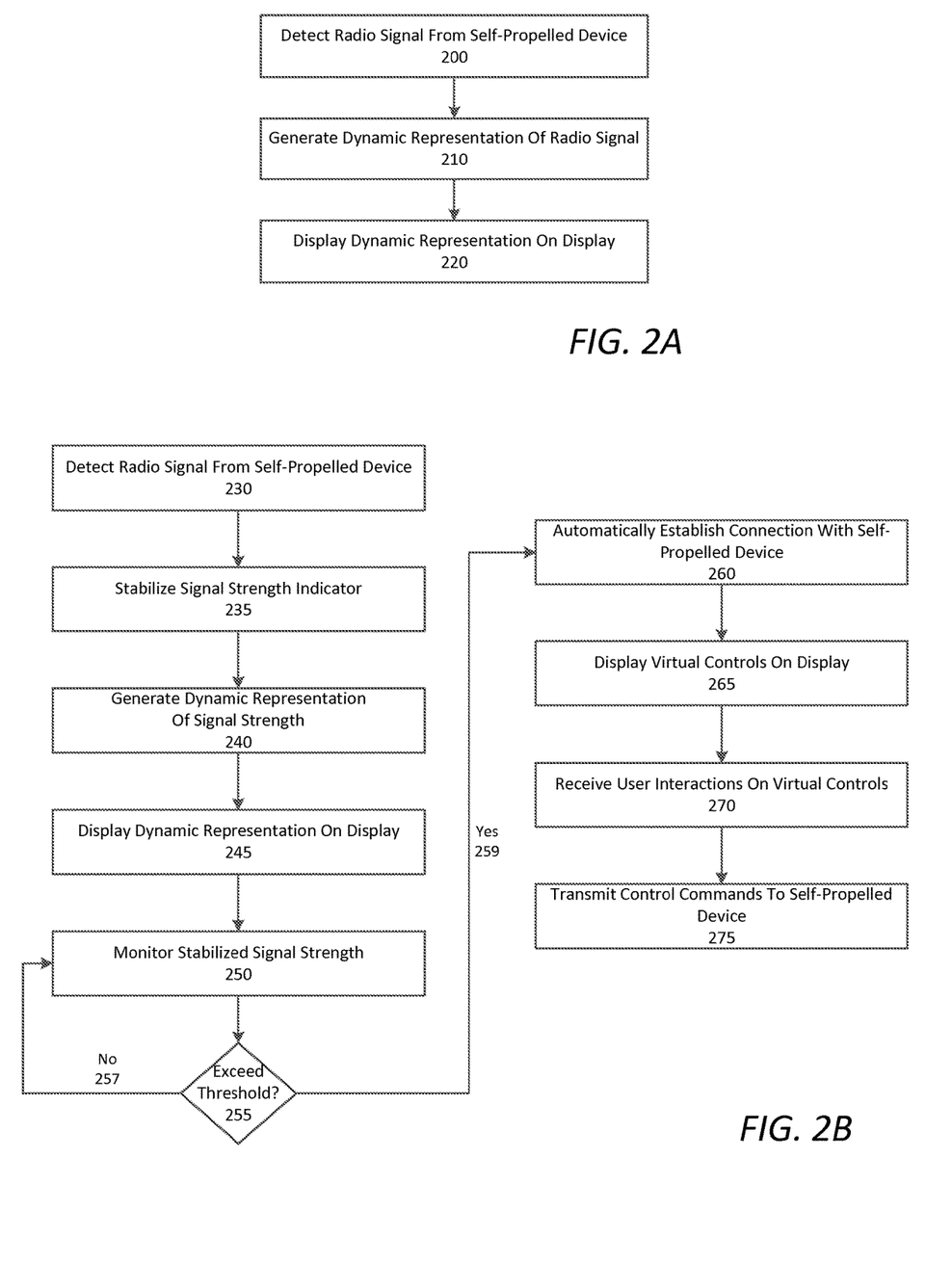
FIG. 2A is a flow chart describing an example high level method of generating a visual representation of the signal strength of a detected radio signal.
FIG. 2B is a flow chart describing an example low level method of facilitating automatic control connection with a self-propelled device.

FIG. 2A is a flow chart describing an example high level method of generating a visual representation of the signal strength of a detected radio signal 154. In the below discussion of FIG. 2A, reference may be made to like reference characters representing various features of FIG. 1 for illustrative purposes. Furthermore, the method described in connection with FIG. 2A may be performed by the mobile computing system 100 as illustrated in FIG. 1. Referring to FIG. 2A, the mobile computing system 100 can initially detect a radio signal 154 emitted from a self-propelled device 150 (200). As described above, the radio signal 154 may be a periodically emitted, low energy beacon at a preconfigured power setting. The emitted signal 154 may be detected by the mobile computing system 100 over an arbitrary distance (e.g., 0-100 meters) depending on a variety of factors, such as noise, sensitivity, power, etc.

Based on the detected radio signal 154, the mobile computing system 100 can generate a dynamic representation of the radio signal 117 based on its signal strength (210). The generated dynamic representation 117 can include a variety of features, and can represent the signal strength in a variety of manners. In one example, the signal strength is represented as a circular or elliptical pattern in relation to a predetermined signal strength threshold. In other implementations, the signal strength may be represented graphically as a live bar graph or live line graph with the threshold indicated respectively. In still further implementations, the signal strength of the radio signal 154 may be represented pictorially as a two-dimensional or three-dimensional animation. With regards to the above implementations, the dynamic representation 117 may be generated in real-time to reflect live changes in the signal strength as the mobile computing system 100 gets closer to the self-propelled device 150.

The generated dynamic representation of the signal strength of the radio signal 117 can then be continuously displayed on the display 120 of the mobile computing system 100 (220).

FIG. 2B is a flow chart describing an example low level method of facilitating automatic control connection with a self-propelled device. In the below discussion of FIG. 2B, reference may also be made to like reference characters representing various features of FIG. 1 for illustrative purposes. Furthermore, the method described in connection with FIG. 2B may be performed by the mobile computing system 100 as illustrated in FIG. 1. Referring to FIG. 2B, the mobile computing system 100 may initially detect a radio signal 154 emitted from the self-propelled device 150 (230). The mobile computing device 100 can then process the radio signal 154 to determine its signal strength and provide a signal strength indicator (e.g., RSSI) for the radio signal 154.

The mobile computing system 100 may then stabilize the signal strength indicator (235) using, for example, a linear regression model. This stabilized signal strength indicator may then be used by the mobile computing system 100 to generate a dynamic representation of the signal strength of the radio signal 154 (240). As discussed above, the dynamic representation may be generated in real-time in any number of variations, and can be displayed on the display 120 of the mobile computing system 100 in real-time as well (245).

The mobile computing system 100 can monitor the stabilized signal strength (or the displayed visual representation 117) (250). As the user moves the mobile computing system 100 towards the self-propelled device 150 the signal strength increases, which can be dynamically reflected on the displayed visual representation 117. A connection and control sequence may be triggered automatically when the stabilized signal strength exceeds a predetermined threshold. Thus, the mobile computing system 100 can make a continuous determination regarding whether the signal strength has exceeded the threshold (255), in which a determination that the signal strength has not exceed the threshold (257) results in further monitoring of the stabilized signal strength (250). Alternatively, the mobile computing system 100 may passively monitor the signal strength, and once the threshold is exceeded (259), the connection and control sequence is initiated automatically. Optionally, the mobile computing system 100 may automatically generate a prompt in response to the threshold crossing so that the user can manually initiate the connection and control sequence.

In various examples, the mobile computing system 100 may then initiate the connection and control sequence by automatically establishing a connection with the self-propelled device 150 (260). The mobile computing system 100 can also initiate a control application 131 in order to display virtual controls 139 on the display 120 (265). As provided above, in many examples, the initiation of the control application 131 can itself cause the connection to be established with the self-propelled device 150 (260), as well as configuring the mobile computing system 100 as a remote controller device to enable user operation of self-propelled device 150 via the virtual controls 139.

The mobile computing system 100 may then receive user interactions 122 on the displayed virtual controls 139 (270). These user interactions 122 may be interpreted by the mobile computing system 100 as control commands 137 to be implemented on the drive system 190 of the self-propelled device 150. As such, the mobile computing system 100 can transmit the control commands 137 to the self-propelled device 150 (275) in order to cause the self-propelled device 150 to be operated in accordance with the user interactions 122 on the virtual controls 139.

Example Self-Propelled Device

Figure 3:
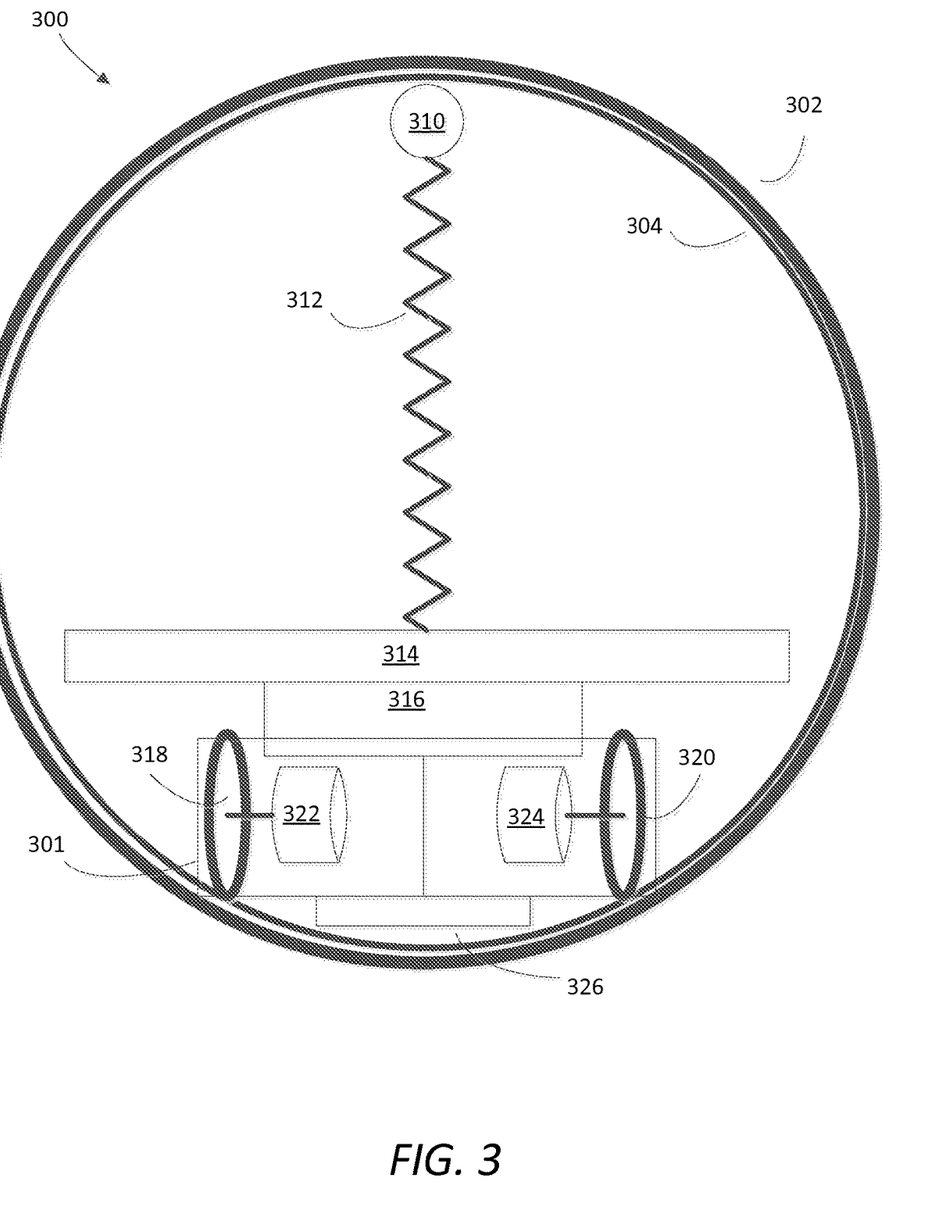
FIG. 3 illustrates schematic diagram of an example self-propelled device upon which examples described herein may be implemented.

FIG. 3 illustrates schematic diagram of an example self-propelled device 300 upon which examples described herein may be implemented. However, variations of the present disclosure are not limited to such devices. Rather, the systems and methods described herein can be implemented with respect to any remote device in which pairings or connections are made. Referring to FIG. 3, the self-propelled device 300 can be of a size and weight allowing it to be easily grasped, lifted, and carried in an adult human hand. The self-propelled device 300 can include an outer spherical shell (or housing) 302 that makes contact with an external surface as the device maneuvers. In addition, the self-propelled device 300 can include an inner surface 304 of the outer shell 302. Additionally, the self-propelled device 300 can include several mechanical and electronic components enclosed by outer shell 302 and inner surface 304 (collectively known as the envelope).

The outer shell 302 and inner surface 304 can be composed of a material that transmits signals used for wireless communication, and yet are impervious to moisture and dirt. The envelope material can be durable, washable, and/or shatter resistant. The envelope may also be structured to enable transmission of light and is textured to diffuse the light.

In one variation, the housing is made of sealed polycarbonate plastic. In one example, at least one of the outer shell 302 or inner surface 304 are textured to diffuse light. In one example, the envelope comprises two hemispherical shells with an associated attachment mechanism, such that the envelope can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 301 to enable the device to propel itself. The drive system 301 can be coupled to processing resources and other control mechanisms, as described with other examples. The carrier 314 serves as the attachment point and support for components of the interior mechanism. The components of the interior mechanism are not rigidly attached to the envelope. Instead, the interior mechanism can be in frictional contact with the inner surface 304 at selected points, and is movable within the envelope by the action of actuators of the drive mechanism.

The carrier 314 can be in mechanical and electrical contact with an energy storage 316. The energy storage 316 provides a reservoir of energy to power the device 300 and electronics and can be replenished through N inductive charge port 326. The energy storage 316, in one example, is a rechargeable battery. In one variation, the battery is composed of lithium-polymer cells. In other variations, other rechargeable battery chemistries are used.

The carrier 314 can provide the mounting location for most of the internal components, including printed circuit boards for electronic assemblies, sensor arrays, antennas, and connectors, as well as providing a mechanical attachment point for internal components.

The drive system 301 includes motors 322, 324 and wheels 318, 320. The motors 322 and 324 connect to the wheels 318 and 320, respectively, each through an associated shaft, axle, and gear drive (not shown). The perimeter of wheels 318 and 320 can be two points where the interior mechanism can be in mechanical contact with inner surface 304. The points where wheels 318 and 320 contact inner surface 304 are an essential part of the drive mechanism of the ball, and so are preferably coated with a material to increase friction and reduce slippage. For example, the wheels 318 and 320 can be covered with silicone rubber tires.

In some variations, a biasing mechanism is provided to actively force the wheels 318, 320 against the inner surface 304. In an example provided, the spring 312 and end 310 can comprise a biasing mechanism. More specifically, spring 312 and spring end 310 are positioned to contact inner surface 304 at a point diametrically opposed to wheels 318 and 320. Spring 312 and end 310 provide additional contact force to reduce slippage of the wheels 318 and 320, particularly in situations where the interior mechanism is not positioned with the wheels at the bottom and where gravity does not provide adequate force to prevent the drive wheels from slipping. The spring 312 is selected to provide a small force pushing wheels 318 and 320, and the spring end 310 evenly against inner surface 304.

The spring end 310 is designed to provide near-frictionless contact with inner surface 304. The spring end 310 comprises a rounded surface configured to mirror a low-friction contact region at all contact points with the inner surface 304. Additional means of providing near-frictionless contact may be provided. In another implementation, the rounded surface may include one or more bearings to further reduce friction at the contact point where end 310 moves along inner surface 304. The spring 312 and the spring end 310 are preferably made of a non-magnetic material to avoid interference with sensitive magnetic sensors.

Figure 4A:
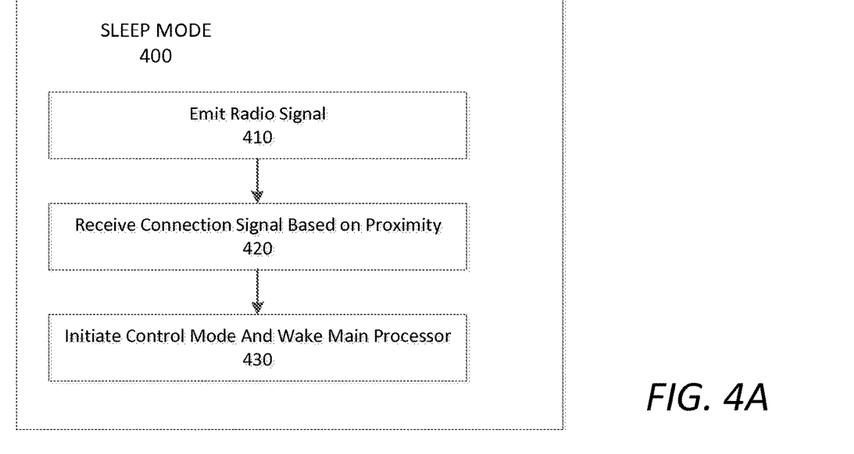
FIG. 4A is a flow chart describing an example process for operating a self-propelled device in a sleep mode.

FIG. 4A is a flow chart describing an example process for operating a self-propelled device in a sleep mode. In the below description of FIG. 4A, reference may be made to like reference characters of the self-propelled device 150 and mobile computing system 100 of FIG. 1. Referring to FIG. 4A, the self-propelled device 150 may initially operate in a sleep mode (400), in which all dynamic functions may be deactivated or powered down. In this sleep mode, a radio processor 170 and signal generator 152 of the self-propelled device 150 can be preconfigured or programmed to emit a continuous radio signal 154 (410). As discussed above, the radio signal 154 may be a beacon transmission advertising the self-propelled device's availability for connection and operation. Such a beacon may be transmitted utilizing included wireless hardware on the self-propelled device 150, which may implement any number of wireless technologies and protocols. In various examples, the emitted radio signal 154 is a Bluetooth low energy signal, enabling the self-propelled device 150 to beacon for an extended period of time (e.g., months). In other examples, the emitted radio signal 154 may be a Wi-Fi, or other wireless advertising beacon or signal emitted at a preconfigured or standardized power level.

The self-propelled device 150 may remain in sleep mode until a connection signal 142 is received from a mobile computing system 100 based on proximity/signal strength (410). As discussed above, the mobile computing device 100 may trigger the connection and control sequence once the signal strength of the emitted radio signal 154 crosses a predetermined threshold. On the self-propelled device 150, the connection and control sequence is initiated when the connection signal 142, which can correspond to the launch of the control application 131, is received.

In response to receiving the connection signal 142, the radio processor 170 of the self-propelled device can awaken the main processor 180 to power up the self-propelled device 150 for operation (430).

Figure 4B:
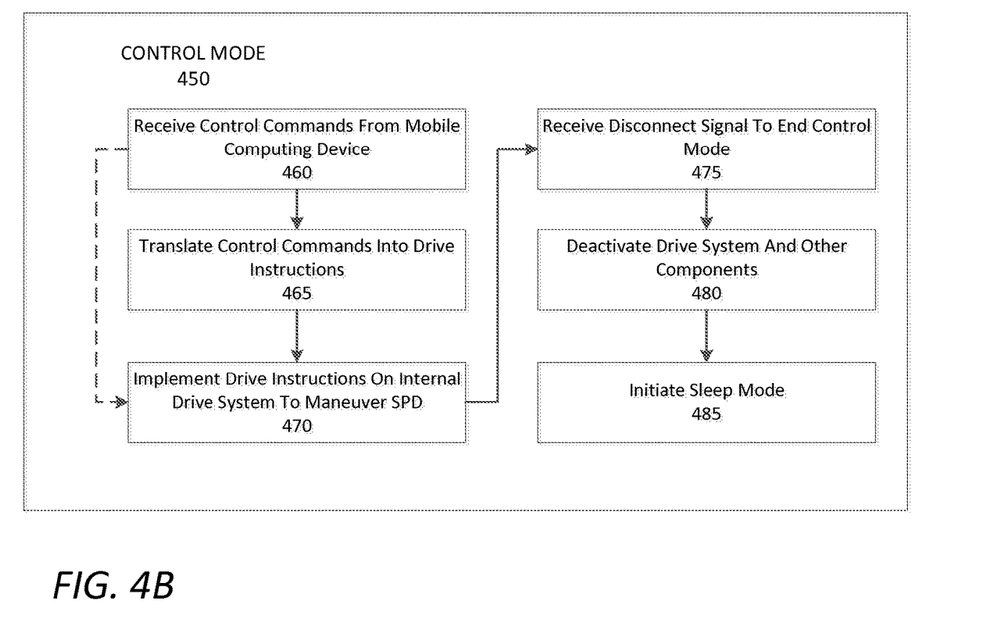
FIG. 4B is a flow chart describing an example process for operating a self-propelled device in a control mode.

FIG. 4B is a flow chart describing an example process for operating a self-propelled device in a control mode. In the below description of FIG. 4B, reference may be made to like reference characters of the self-propelled device 150 and mobile computing system 100 of FIG. 1. Referring to FIG. 4B, once the self-propelled device 150 is powered up and the control connection with the mobile computing system 100 is established, the self-propelled device may receive a number of control commands 137 from the mobile computing system 100 based on user interactions 122 with virtual controls 139 rendered on the display 120 (460). In some variations, the self-propelled device 150 may directly implement the control commands 137 on the drive system 190 to maneuver the self-propelled device 150 in accordance with the user interactions 122 on the mobile computing system 100 (470). In other variations, the main processor 180 of the self-propelled device 150 can receive the control commands 137 and translate them into drive instructions (465). Accordingly, these translated drive instructions may be implemented on the drive system 190 in order to maneuver the self-propelled device 150 (470).

A user may operate the self-propelled device 150 for any period of time limited only by battery power available on the self-propelled device 150. Among the user interactions with the mobile computing system 100, the user may end an operation session by deactivating or otherwise ending operation of the control application 131 on the mobile computing system 100. Prior to ending the session, the mobile computing system 100 may transmit a disconnection signal to the self-propelled device 150. Thus, the self-propelled device 150 can receive the disconnect signal to end the control mode (475). In response to receiving the disconnect signal, the main processor 180 can power down the dynamic components of the self-propelled device 150, including the drive system 190 (480). The main processor 180 may then initiate sleep mode, in which the radio processor 170 and signal generator 152 can emit beacons according to the examples described herein (485).

Hardware Diagram

Figure 5:
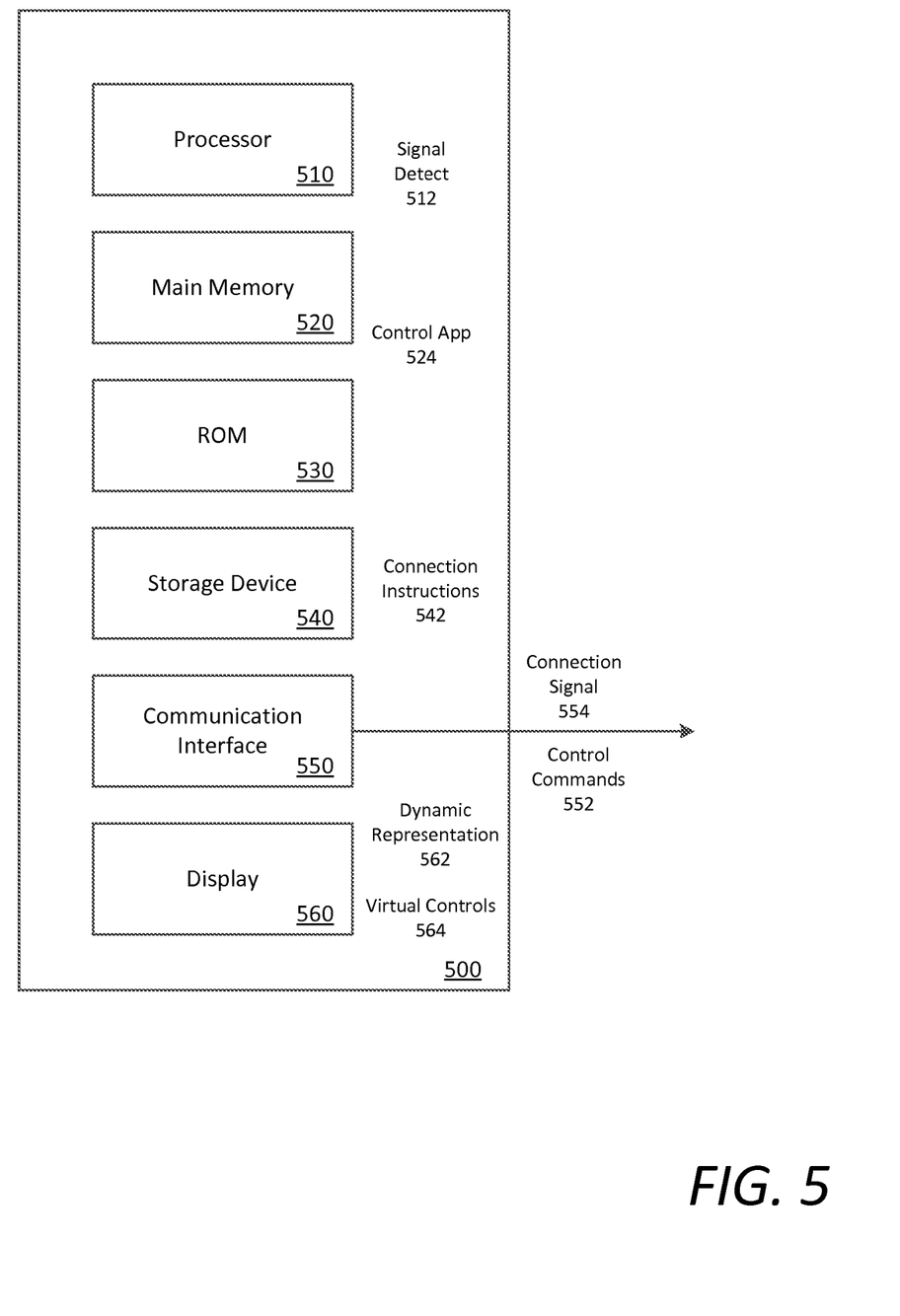
FIG. 5 is a block diagram illustrating a computer system upon which examples described may be implemented.

FIG. 5 is a block diagram that illustrates a computer system upon which examples described may be implemented. For example, one or more components discussed with respect to the systems and the methods described herein may be performed by the system 500 of FIG. 5. The systems and methods described can also be implemented using a combination of multiple computer systems as described by FIG. 5.

In one implementation, the computer system 500 includes processing resources 510, a main memory 520, ROM 530, a storage device 540, a communication interface 550, and a display 560. The computer system 500 includes at least one processor 510 for processing information and a main memory 520, such as a random access memory (RAM) or other dynamic storage device, for storing information and instructions 522 to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that store connection instructions 542 for performing operations discussed with respect to FIGS. 1-4.

The communication interface 550 can enable computer system 500 to communicate with a self-propelled device (e.g., cellular or Wi-Fi network) through use of a network link (wireless or wire line). Using the network link, the computer system 500 can communicate with a plurality of devices, such as the self-propelled device 150. The main memory 520 of the computer system 500 can further store the control application 524 which can be launched by the processor 510 upon exceeding the signal strength threshold. According to some examples, the computer system 500 can detect the emitted radio signal 512 from the self-propelled device, and in response to the signal exceeding the threshold signal strength, the processor can automatically generate the connection signal 554 to transmit to the self-propelled device via communication interface, and/or launch the control application 524. Furthermore, the processor can generate and render the dynamic representation of the signal strength 562 upon the display 560. Upon launch of the control application 524, the processor can further generate and render virtual controls 564 upon the display 560. User interactions with the virtual controls 564 on the display 560 can cause the processor 510 to transmit control commands 552 to the self-propelled device via the communication interface 550.

Examples described herein are related to the use of computer system 500 for implementing the techniques described herein. According to one example, those techniques are performed by computer system 500 in response to processor 510 executing one or more sequences of one or more instructions contained in main memory 520, such as the control application 524. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry and/or hardware may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A method of connecting to a remote controlled device, the method performed by one or more processors of a mobile computing device and comprising:
   detecting a radio signal emitted from the remote controlled device;
   based on the detected radio signal, generating a dynamic representation of a signal strength of the radio signal; and
   when the signal strength reaches a predetermined threshold, automatically connecting to the remote controlled device.

2. The method of claim 1, further comprising:
   when the signal strength crosses a predetermined threshold, automatically initiating a control application to establish a connection with the remote controlled device.

3. The method of claim 2, wherein initiating the controller application comprises displaying virtual interactive controls on a display, the method further comprising:
   receiving an interaction at the controller application; and
   in response to receiving the interactions, transmitting control commands to the remote controlled device to cause the remote controlled device to maneuver in accordance with the interaction.

4. The method of claim 1, wherein the radio signal emitted from the remote controlled device comprises a wireless signal, the wireless signal comprising at least one of:
   a Bluetooth low energy beacon,
   a Wi-Fi signal; or
   a wireless USB signal.

5. The method of claim 4, further comprising:
   in response to detecting the wireless signal, stabilizing a received signal strength indicator (RSSI) corresponding to the wireless signal.

6. The method of claim 5, wherein stabilizing the RSSI comprises inputting received RSSI values into a linear regression model to output the stabilized RSSI.

7. The method of claim 5, wherein the generated dynamic representation of the signal strength is based on the stabilized RSSI and further comprising displaying the dynamic representation of the signal strength.

8. A mobile computing device comprising:
   a display;
   one or more processors; and
   one or more memory resources storing instructions that, when executed by the one or more processors, cause the mobile computing device to:
      detect a radio signal emitted from a remote controlled device;
      based on the detected radio signal, generate a dynamic representation of a signal strength of the radio signal; and
      when the signal strength reaches a predetermined threshold, automatically connect to the remote controlled device.

9. The mobile computing device of claim 8, wherein the executed instructions further cause the mobile computing device to:
   when the signal strength crosses a predetermined threshold, automatically initiating a control application to establish a connection with the remote controlled device.

10. The mobile computing device of claim 9, wherein initiating the controller application comprises displaying virtual interactive controls on the display, and wherein the executed instructions further cause the mobile computing device to:
   receive an interaction at the controller application; and
   in response to receiving the interaction, transmit control commands to the remote controlled device to cause the remote controlled device to maneuver in accordance with the interaction.

11. The mobile computing device of claim 8, wherein the radio signal emitted from the remote controlled device comprises a wireless signal, the wireless signal comprising at least one of:
   a Bluetooth low energy beacon,
   a Wi-Fi signal; or
   a wireless USB signal.

12. The mobile computing device of claim 11, wherein the executed instructions further cause the mobile computing device to:
   in response to detecting the wireless signal, stabilize a received signal strength indicator (RSSI) corresponding to the wireless signal.

13. The mobile computing device of claim 12, wherein stabilizing the RSSI comprises inputting received RSSI values into a linear regression model to output the stabilized RSSI.

14. The mobile computing device of claim 12, wherein the generated dynamic representation of the signal strength is based on the stabilized RSSI.

15. A device comprising:
   a radio processor;
   a main processor; and
   one or more memory resources storing instructions that, when executed by the radio processor and the main processor, cause the device to:
      in a sleep mode, utilize the radio processor to: (i) emit a radio signal, (ii) establish a connection with a mobile computing device based on a proximity of the mobile computing device to the device, and (iii) in response to establishing the connection, awaken the main processor of the self-propelled device.

16. The self-propelled device of claim 15, wherein awakening the processor initiates a control mode on the device, and wherein the executed instructions further cause the self-propelled device to:
   in the control mode, utilize the main processor to: (i) receive control commands from the mobile computing device to perform an action by the device, and (ii) implement the control commands to perform the action.

17. The self-propelled device of claim 15, wherein the radio signal corresponds to a wireless signal, the wireless signal comprising at least one of:
   a Bluetooth low energy beacon,
   a Wi-Fi signal; or
   a wireless USB signal.

18. The self-propelled device of claim 15, wherein the executed instructions further cause the device to:
   in response to awakening the main processor of the, perform a greeting function comprising one or more of (i) receiving information from the mobile computing device, (ii) initiating a visual and/or an audible salutation, or (iii) communicating an audible greeting based on the received information.

\* \* \* \* \*